Nov. 6, 1956  L. T. NEFF  2,769,215
WEATHER STRIP
Filed Jan. 19, 1954
Fig. 1
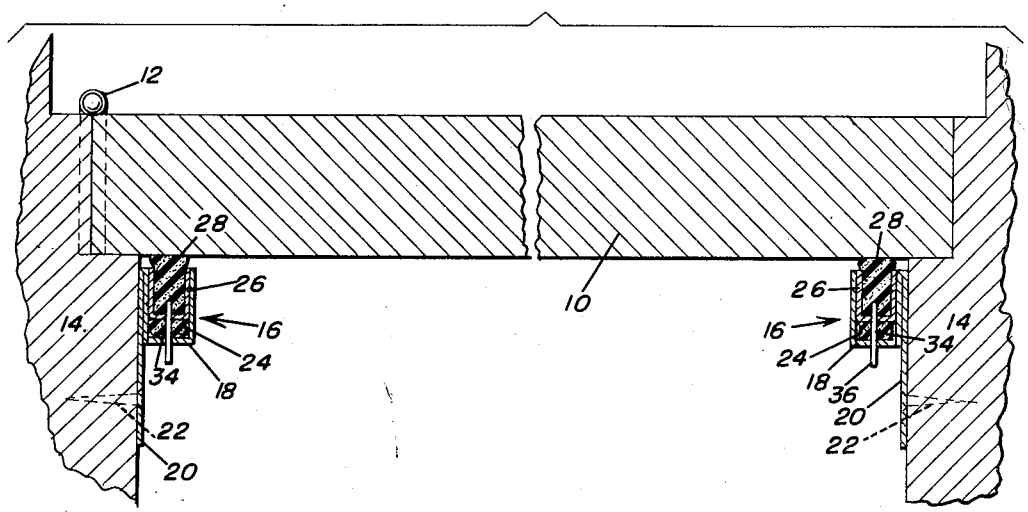
Fig. 2
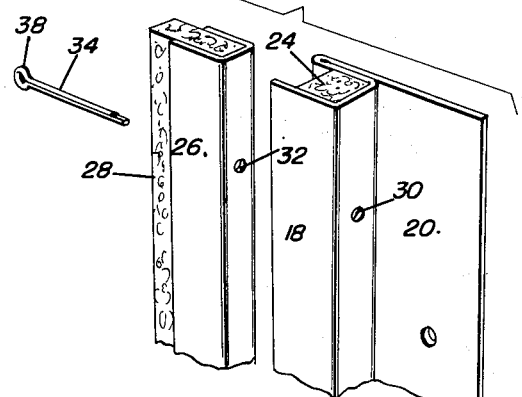
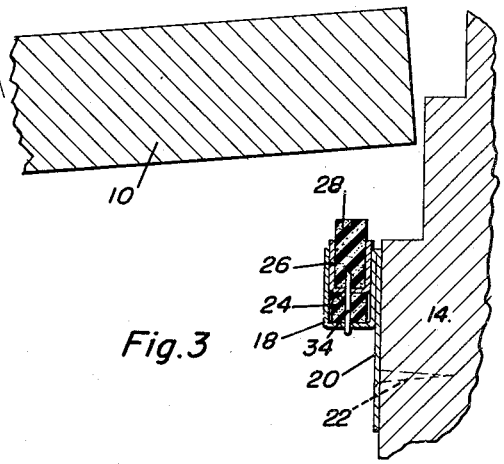
Fig. 3
Fig. 4
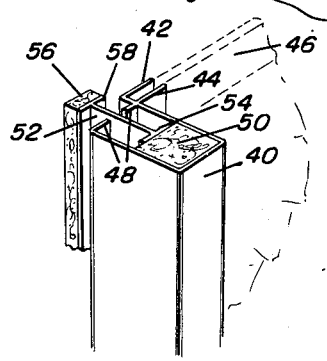
Lewis T. Neff
  INVENTOR.
BY *Clarence A. O'Brien*
and *Harvey B. Jacobson*
                    Attorneys

United States Patent Office 2,769,215
Patented Nov. 6, 1956

2,769,215
WEATHER STRIP

Lewis T. Neff, Roswell, N. Mex., assignor of one-fourth to Lewis E. Neff, one-fourth to Edsel B. Neff, and one-fourth to George D. Neff Application January 19, 1954, Serial No. 404,953

1 Claim. (Cl. 20—68)

This invention relates to weather stripping and has for its primary object the provision of weather stripping which is capable of being readily and easily attached to a suitable supporting surface while being very effective in operation.

The construction of this invention features means for mounting a resilient pad on a supporting surface for contact with a closure member. This means includes a pad supporting member which is supported within a channel-shaped member. The channel-shaped member is provided with a resilient pad therein which is compressible to therefore provide additional freedom of movement of the weather stripping.

Another important object of this invention resides in the provision of resilient mounting means for a pad supporting member so that the pad supporting member itself will be continuously pressed into engagement with the closure member.

Still further objects and features of this invention reside in the provision of a weather stripping arrangement that is strong and durable, simple in installation, relatively inexpensive to construct, unobtrusive in appearance, and capable of sealing closure members, such as doors or windows, against drafts and the like.

These, together with the various ancillary objects and features of the invention which will become apparent as the following description proceeds, are attained by this weather strip, preferred embodiments of which have been illustrated in the accompanying drawings, by way of example only, wherein:

Figure 1 is a sectional view illustrating the weather stripping arrangement as associated with a door or other similar closure device;

Figure 2 is a partial perspective view in an exploded form illustrating the component elements of the weather stripping;

Figure 3 is a sectional view similar to that shown in Figure 1, but illustrating the closure device in an open position; and Figure 4 is a perspective view of a modified form of the invention as adapted for use with a closure device, such as a window or the like.

With continuing reference to the accompanying drawings, wherein like reference numerals designate like parts throughout the various views, reference numeral 10 generally designates a door or other similar closure device which is hingedly attached, as at 12, to a suitable door frame 14 or the like, which forms a supporting surface for the weather stripping such as generally indicated by reference numeral 16.

The weather stripping arrangement 16 comprising the present invention includes a first channel-shaped member 18 which has preferably integrally formed therewith a flange 20 provided with apertures therethrough through which fasteners, such as screws 22, extend, the fasteners 22 being adapted to secure the weather stripping 16 to the supporting structure 14.

Within the channel-shaped member 18 there is secured a resilient pad 24. Another channel-shaped member 26 of slightly reduced size is slidably received within the first channel-shaped member 18 and has a second resilient pad 28 secured therein. This second resilient pad is of such dimensions as to have a considerable portion thereof extend outwardly from the second channel-shaped member 26 to form a resilient engaging buffer for the closure member 10.

The first channel member 18 is apertured as at 30, and the channel member 26 has apertures 32 therethrough in alignment with the apertures 30. The first resilient pad 24 is likewise provided with an aperture therethrough so that cotter keys 34 or like fasteners can be inserted through the apertures 32 and 30, as well as through the pad 24. The free ends of the cotter keys 34 will form a stop, as at 36, and the heads 38 of the cotter keys 34 are then adapted to form a stop for limting the outward movement of the second channel-shaped member 26 relative to the channel-shaped member 18. It is to be recognized that the resilient pad 28 can be installed within the channel-shaped member 28 after the cotter keys 34 have been positioned, or at any other suitable time.

It is to be noted that when the door is closed from the position as is shown in Figure 3 to that as is shown in Figure 1, the closure member 10 will abut against the resilient pad 28 and somewhat compress the resilient pad forming a seal between the resilient pad 28 and the closure 10. In order to prevent the resilient member 28 from losing its resiliency and to further provide a resilient mounting for the channel member 26, the pad 24 is also compressed upon the closing of the closure member 10.

In Figure 4, there is shown a modified form of the invention which includes a first channel-shaped member 40 having a pair of flanged portions 42 and 44 preferably integrally formed therewith for clamping engagement with a window, as at 46, or other similar closure member. The channel-shaped member is further provided with inwardly extending flanges, as at 48. A resilient pad 50 is received within the channel-shaped member 40 and a pad holding member 52 provided with a pressure plate 54 adapted to engage the pad 50 is received within the channel-shaped member 40. The flanges 48 are adapted to prevent the disengagement of the pad holding member 52 from the channel-shaped member 40, it being noted that the pad holding member 52 may be slid laterally into the channel 40 when originally assembling the weather stripping. A second resilient pad 56 is bonded or otherwise affixed to a supporting plate 58 of the pad supporting member 52. When the window 46 is closed, the pad 56 will abut against the window frame or other suitable structure to form a seal for the window 46. In order to preserve the resiliency of the pad 56 while also providing a resilient mounting for the pad supporting member 52, the pad 50 will also be compressed.

Since from the foregoing, the construction and advantages of this weather stripping are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

What is claimed as new is as follows:

A weather stripping arrangement comprising a channel-shaped member, means for attaching said channel-shaped member to a supporting structure, a first resilient pad received in said channel-shaped member, a pad supporting element slidably received in said channel-shaped member, said pad supporting element including a pressure plate adapted to engage said first resilient pad, and a supporting plate spaced from said pressure plate, a second resilient pad affixed to said supporting plate outwardly of said channel-shaped member, and means limiting the outward movement of said pad supporting element from said channel-shaped member, said means including flanges attached to said channel-shaped member for retaining said pressure plate within said channel-shaped member.

References Cited in the file of this patent

UNITED STATES PATENTS

| | | |
|---|---|---|
| 652,489 | Sandberg et al. | June 26, 1900 |
| 746,910 | Zimmerman | Dec. 15, 1903 |
| 2,494,247 | Kinish | Jan. 10, 1950 |
| 2,694,239 | Brunker | Nov. 16, 1954 |